United States Patent [19]

Corris et al.

[11] Patent Number: 4,558,177

[45] Date of Patent: Dec. 10, 1985

[54] REGULATED OUTPUT CURRENT SOURCE FOR CORDLESS TELEPHONES

[75] Inventors: C. James Corris, Shenandoah; Blaine E. Beck, Peachtree City, both of Ga.

[73] Assignee: Cellutron Corporation, Stamford, Conn.

[21] Appl. No.: 708,381

[22] Filed: Mar. 7, 1985

Related U.S. Application Data

[63] Continuation of Ser. No. 538,520, Oct. 3, 1983, abandoned.

[51] Int. Cl.[4] .................................................. H04Q 7/04
[52] U.S. Cl. ............................... 179/2 EA; 179/2 E; 455/89; 455/117; 455/126
[58] Field of Search .......................... 179/2 E-2 EC, 179/2.51; 455/19, 89, 117, 126, 127, 129, 270, 343; 340/310 R, 310 A, 310 CP

[56] References Cited

U.S. PATENT DOCUMENTS

| | | | |
|---|---|---|---|
| 2,085,125 | 6/1937 | Shaw | 250/17 |
| 2,581,983 | 1/1952 | Thompson | 455/270 |
| 2,896,073 | 7/1959 | Westphal | 250/17 |
| 3,493,867 | 2/1970 | Arase | 455/126 |
| 3,955,144 | 5/1976 | Dishal | 455/126 X |
| 4,044,308 | 8/1977 | Stites et al. | 325/144 |
| 4,114,108 | 12/1978 | Faulkenberry et al. | 330/207 |
| 4,147,985 | 4/1979 | Rogers | 325/144 |

Primary Examiner—Gene Z. Rubinson
Assistant Examiner—W. J. Brady

[57] ABSTRACT

A circuit for providing a constant current to an output stage of a cordless telephone transmitter using AC power lines as a transmission medium to maintain the RF component on the AC lines to within regulated limits. The RF component is sensed to provide a control signal to a voltage-responsive capacitor in a tuned circuit connected to a tuned coupling transformer between a modulating circuit and the transmitter output amplifier. When the RF component exceeds the current limit of 90 mA, the coupling transformer is detuned to maintain the RF current in the power lines to within the regulated limits.

7 Claims, 3 Drawing Figures

REGULATED OUTPUT CURRENT SOURCE FOR CORDLESS TELEPHONES

This application is a continuation of application Ser. No. 538,520 filed Oct. 3, 1983, now abandoned.

BACKGROUND OF THE INVENTION

This invention relates generally to cordless telephones and, more particularly, to a circuit for providing a constant current to an output stage of a cordless telephone transmitter using AC power lines as a transmission medium. Still more particularly, this invention relates to a constant current source for regulating RF signals in an AC power line acting as a transmission medium for cordless telephones to within regulated limits to minimize the effect of impedance variations in those lines while maximizing the RF output signal within those prescribed limits.

In the prior art, cordless telephone systems are known which include a cordless telephone and a base unit, each of which includes a transmitter and a receiver for exchanging modulated RF carrier signals, modulated by telephone switching signals and audio signals to and from the cordless telephone. In general, the cordless telephone includes a speaker, a microphone, an antenna, a transmitter, and a receiver for communicating telephone switching signals and audio signals to and from the base unit via the RF carrier signal. The base unit includes an antenna, a transmitter, and a receiver for similarly communicating the modulated RF carrier signal to the cordless telephone. Such systems generally operate in a duplex mode permitting simultaneous transmission and reception of the signals and require the use of two frequencies for each cordless telephone. Such devices are regulated as low power communication devices by the Federal Trade Commission (FCC). In the past, cordless telephones have operated at a frequency between 26.9 and 27.3 MHz, while currently many cordless telephone systems operate at about 1.7 MHz. A prior art cordless telephone utilized carrier current techniques for the base station transmitter of the phone and a 27 MHz return frequency for the portable handset transmitters. As is well known, carrier current systems use a technique which couples radio frequency (RF) energy into the electrical wiring or the telephone wiring which act effectively as an antenna for reception by a nearby receiver. Thus, the telephone and electrical wiring of the site of the base unit become a cable acting as an antenna. Currently, most carrier-type cordless telephones operate at about 1.7 MHz, while proposals are pending to shift the transmitter frequency of the base station portion of the telephones from 27 MHz to 1.7 MHz or to other frequency ranges using carrier current techniques.

Accordingly, current cordless telephones operate in the duplex mode at 49 MHz for the portable transmitter and 1.7 MHz for the base station transmitter using carrier current techniques. Since carrier current systems are classified by the FCC as restricted radiation devices, the level of RF energy from any part of the system may not exceed a prescribed limit and may not interfere with other authorized radio communications. To this end, the carrier current portion of the cordless telephone is presently restricted to operation at a frequency at a band of 1625 KHz to 1800 KHz wherein the RF currents on the power cord and telephone line of each cordless phone shall not exceed 90 milliamps on any single power conductor or 12 milliamps on the telephone line in accordance with prescribed procedures.

Because cordless telephones are thus limited in their range of operation to a range of several hundred feet from the base station, it is thus a problem in this art to maximize the transmitted RF signal to 90 milliamps in order to maximize the power transmission of the base unit and the associated range of the cordless unit while complying with regulated power transmission limitations.

Maintaining the transmitted RF signal to 90 milliamps has presented an additional problem in the development of cordless telephones because of variations in the wiring of the site in which the base unit is used. Building codes often require that buildings be wired with conductors joined with a ground wire. As a result, the capacitance between the conductors and to ground is significantly high, thus causing considerable attenuation of the high frequency signals involved, which are typically on the order of 1.7 MHz. In addition, building codes also require that in commercial and multiple dwelling buildings, the wiring be located in a conduit which further increases the capacitance since the conduit is grounded. Moreover, inductive loads, such as motors, power transformers, and the like connected to the building or dwelling are effectively in parallel with the capacitance of the wiring and thus form effective high frequency filters, thus affecting the transmission of the RF signal in a cordless telephone.

Accordingly, it is a primary object of this invention to provide a means in a cordless telephone system for minimizing the effects of impedance variations in the AC power lines used as a transmission medium for RF signals, while maximizing the available RF power output from the system to within regulated limits.

It is another object of this invention to provide a circuit which maximizes the power transmission capability of a cordless telephone while limiting the available RF current signal in the AC power lines acting as a transmission current carrier to the prescribed maximum of 90 mA.

It is a further object of this invention to minimize the effects of variations in the power line impedances from one location to another when acting as the transmission medium for the signals of a cordless telephone, while maintaining the RF current on such lines at about its maximum permitted regulated level.

These and other objects of this invention will become apparent from a written description of the invention which follows, taken in conjunction with the accompanying drawings.

SUMMARY OF THE INVENTION

Directed to achieving the general objects indicated above, this invention relates to a circuit for providing a constant current to an output stage of a cordless telephone transmitter using the AC power lines of the site of installation as a transmission medium. The cordless telephone system includes a portable telephone unit and a base unit, together operatively connected to telephone lines and AC power lines through the base unit to exchange an RF carrier signal modulated by telephone switching signals and audio signals transmitted between the portable telephone unit and the base unit. Such a unit maximizes the transmission power of the unit within a prescribed, limited, regulated RF carrier current, thus maximizing the range of operation for the portable unit from the base unit. Such a circuit also provides compliance with FCC regulations limiting the RF current in such power lines to not more than 90 milliamps, when tested according to specified test procedures.

The circuit includes an input source of modulated RF signals comprising an RF carrier signal of a predetermined transmission frequency, typically 1.7 MHz, modulated by a modulating signal, typically in the audio range, for transmitting information in a range of frequencies separate from the transmission frequency of said RF carrier signal. The input source comprises a crystal controlled oscillator tuned to a frequency of 1.7 MHz and associated components, including an amplifier, for modulating the 1.7 MHz RF signal with the audio signal.

Coupling means are provided for receiving the modulated RF signals from the input source and providing an output signal which in turn acts as the input signal for the power amplifier output stage of the transmitter. The coupling means includes a tuned transformer operatively connected in circuit with a tuning circuit which includes a primary of the tuned transformer. The transformer is tuned to about the frequency of the RF transmission signal. The tuning circuit further includes a controlled reactive impedance, preferably a voltage controlled variable capacitor, for varying the tuning of the transformer (sometimes referred to as "detuning") to within a limited range of frequencies about the RF transmission signal. A control signal for the voltage variable capacitor is provided from a sensing circuit which senses and monitors the level of RF current in the AC power line to detune the transformer within the limited range of frequencies about the RF transmission signal, thus to limit the RF power on the AC power line to 90 milliamps.

The output of the coupling means is connected to the input of the power amplifier output means having its output coupled to the AC power line. The amplifying means include a two-stage transistor amplifier which is transformer coupled to a tuned circuit.

Means are provided for sensing the magnitude of the RF current in the RF signal on the AC power line provided by the output of the amplifying stage. In response to the sensed RF current signal, the sensing means provides a control signal representative of the strength of the RF component to the voltage variable capacitor to detune the transformer in the coupling means, thus to control the signal to the output amplifying stage and to limit the current to the AC power line. Preferably, the sensing circuit includes a resistor having a predetermined resistance value in circuit in the AC power lines which provides an output signal coupled through a turn of a sensing transformer to provide a rectified and filtered control signal to the voltage variable capacitor. By such circuit, the effects of impedance variations in the AC power lines when acting as a transmission medium are minimized. Such circuit is effective to compensate for such impedance variation between different points in time for a single installation such as may be caused by inductive variations or temperature changes, for variation caused by different placement of the unit in a single location, or between varying capacitances in different locations. Thus, the transmission characteristics for the cordless telephone are satisfactory and within prescribed regulated limits when moved, for example, from home to office, or from point of demonstration to another site, while maximizing the output power of the unit within those limits. Thus, another advantage of the circuit is in extending the range of the cordless telephone to a maximum range.

These and other objects and features of the invention will be described in greater detail in connection with the description of the preferred embodiments.

DETAILED DESCRIPTION OF THE PREFERRED EMBODIMENTS

Figure 1:
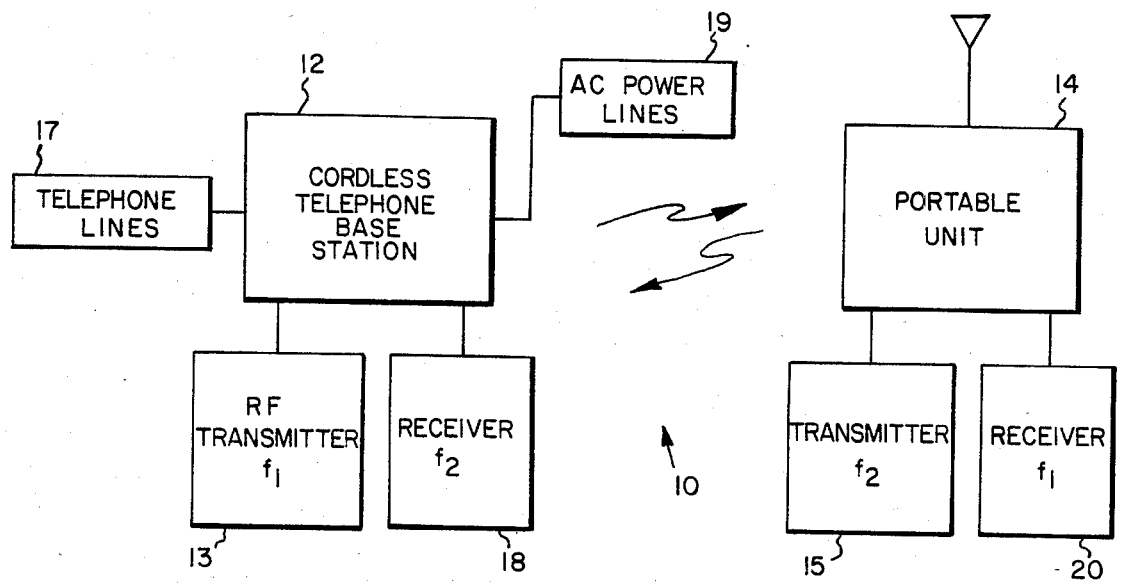
FIG. 1 is a block diagram of a carrier current cordless telephone system known generally to the prior art.

In FIG. 1, a prior art cordless telephone system is designated generally by the reference numeral 10 and comprises a base station 12 and a portable unit 14. The base station 12 includes an RF transmitter 13 for transmitting modulated RF signals at a predetermined carrier frequency, typically 1.7 MHz. The portable unit 14 includes a transmitter 15 for transmitting modulated RF signals at a predetermined frequency, typically 49 MHz. The base station 12 further includes a receiver 18 for receiving signals from the transmitter 15 of the portable unit 14 at the prescribed frequency while the portable unit 14 also includes a receiver 20 for receiving signals from the RF transmitter 13 of the base station 12.

The system 10 operates in the duplex mode and is connected to telephone lines 17 to establish telephone interconnection as is well known in the art. The base unit 12 is also connected to AC power lines 19 at the site of installation, such as a home, building, or commercial establishment, which supply power to the unit 10. The unit 10 also operates in the crarier current mode so that the AC power lines 19 act as a transmission medium for the modulated RF signal. The signal on the AC power line is regulated to a maximum of 90 milliamps which limitation is provided by the invention shown in FIGS. 2 and 3 while maximizing the power transmission of the base station 12 and minimizing the effect of impedance variations in the AC power lines 19.

Figure 2:
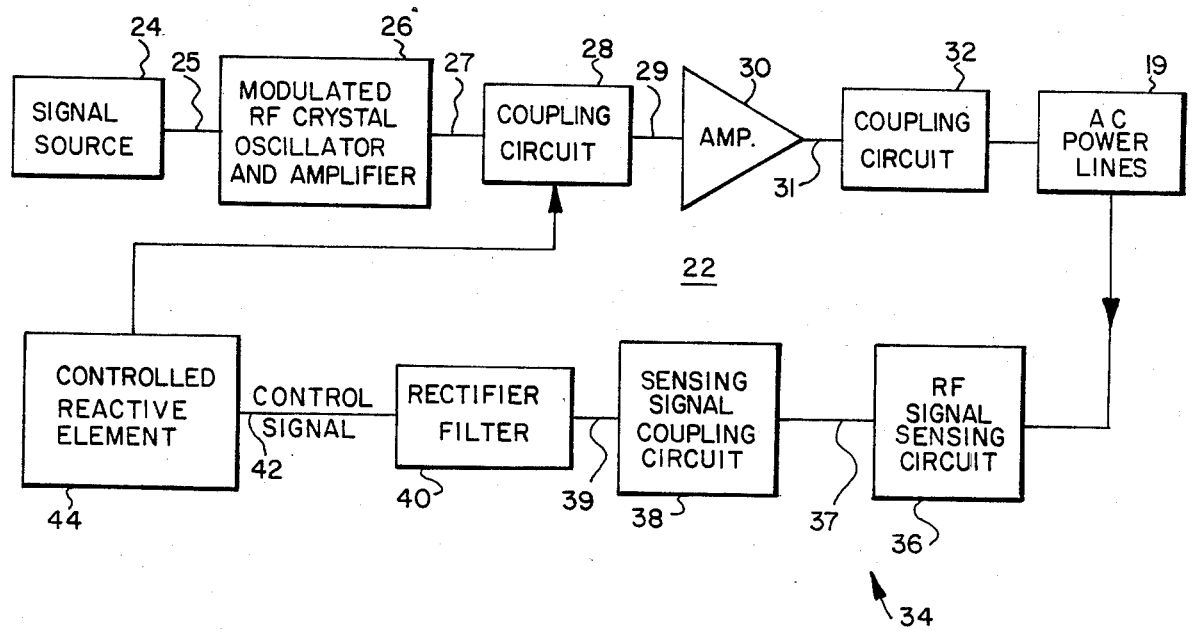
FIG. 2 is a block diagram of components of the system according to the invention.

FIG. 2 is a block diagram of a constant current system 22 according to the invention. The system 22 includes a signal source 24, which typically is a source of audio signals received from the telephone lines 17 for voice transmission to the portable unit 14. The signals from the signal source 24 are provided to a modulated RF crystal oscillator 26 tuned to the carrier RF frequency, typically 1.7 MHz, to provide at the output 27 of the oscillator 26 a modulated RF carrier signal. The oscillator 26 may include an amplifier for amplifying the amplitude of the output signal on lead 27.

The output from the oscillator and amplifier 26 is provided to a coupling circuit 28, the output of which on lead 29 is provided to the input of a power output stage amplifier 30. The output of the power output stage amplifier 30 is coupled on lead 31 to a coupling circuit 32 for coupling the modulated audio signal to the AC power lines 19. In the embodiment shown, the AC power lines constitute a transmission medium for the modulated RF signal.

The constant current control circuit is designated in FIG. 2 generally by the reference numeral 34 which, in conjunction with the AC power lines 19 and the coupling circuit 28, serves to limit the RF component on the power lines 19 to 90 milliamps or to a value as close to 90 milliamps as possible but within that limit, given the presence of impedance variations in the AC lines 19. The circuit 34 includes an RF signal sensing circuit 36 which senses the RF level on the AC power lines 19 to provide an output signal on lead 37 to the sensing signal coupling circuit 38 having its output on lead 39 which in turn is rectified and filtered by a circuit 40 to provide a control signal on lead 42 to a controlled reactive element 44 providing a portion of the coupling circuit 28.

When the RF current on the AC lines 19 is above 90 milliamps, the signal sensed by the circuit 34 acts to vary the impedance of the controlled reactive element 44 to vary the degree of coupling of the circuit 28 in a manner which returns the RF signal power to 90 milliamps. Because the coupling circuit 28 preferably includes a tuned transformer, detuning of the circuit either slightly above or slightly below its optimally tuned value equivalent to the RF carrier, the RF signal on the AC power lines is returned to the 90 milliamp optimum level.

Figure 3:
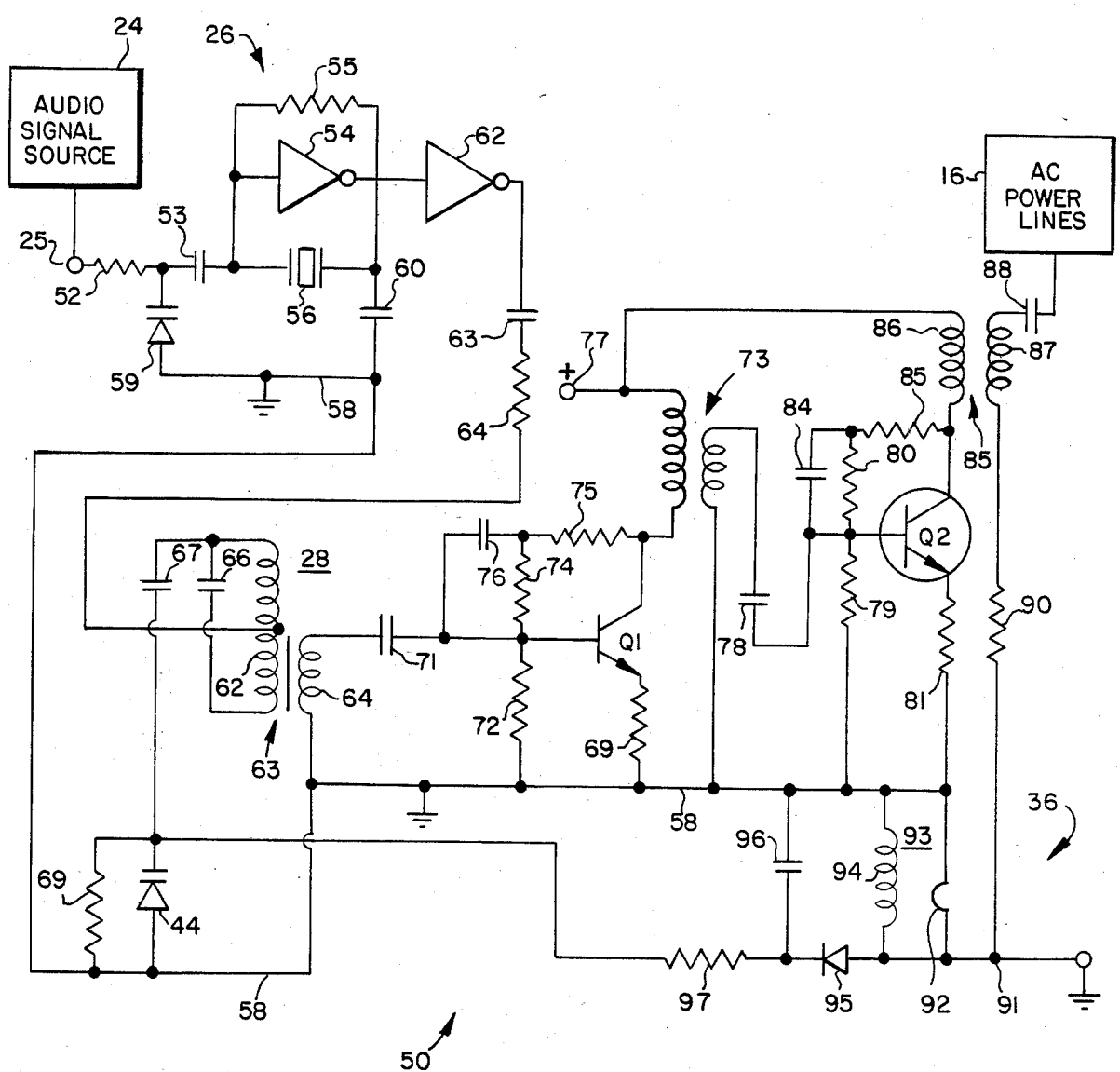
FIG. 3 is a detailed circuit diagram of the constant current circuit for cordless telephones according to the invention.

A specific embodiment of the circuit of FIG. 2 in wiring diagram form is shown in FIG. 3, where the circuit is designated generally by the numeral 50. The audio signal source 24 is connected on the input lead 25 through a resistor 52 to the input of the modulated RF crystal oscillator and amplifier 26. Thus, the signal at the output of the resistor 52 is provided through a capacitor 53 to the input of an operational amplifier 54 having a feedback resistor 55 and a crystal oscillator 56 connected between the input and the output of the amplifier 54 in a conventional fashion. The junction between the resistor 52 and the capacitor 53 is connected to a reference voltage source 58, such as ground, through a voltage variable diode 59. The junction between the output of the amplifier 54 and the crystal oscillator 56 is connected to the reference source or ground 58 through a capacitor 60.

The output of the operational amplifier 54 provides the input to a second operational amplifier 62 to amplify the modulated signal. The output from the amplifier 62 is coupled through a capacitor 63 and a resistor 64 to the input of the coupling circuit 28 and, more particularly, to the center tap on a primary 62 of a transformer 63 having a secondary 64. The transformer 63 is optimally tuned to the RF transmission frequency, typically 1.7 MHz, by a capacitor network including a capacitor 66 in parallel with the primary 62, a capacitor 67, and a controlled capacitor 44, the operation of which will be further discussed. The coupling circuit 28 thus includes a controlled reactive element 44 and, more particularly, a voltage variable capacitor in series circuit with a capacitor 67. A terminal of the capacitor 44 is connected through a level setting resistor 69 to a source of reference potential 58.

The secondary 64 of the transformer 63 is connected through a capacitor 71 to the base input of a two-stage transistor power amplifier having transistors Q1 and Q2. The bias level for the power output stage is set by a resistor 72 connected between the base and a source of reference voltage 58 and a series connected resistor 74 which, in turn, is in series with a resistor 75 with the collector of Q1. The emitter of transistor Q1 is connected to a source of reference potential 58 through a resistor 69. The resistor 75 is in circuit with the primary of a transformer 73 which is connected to a source of positive potential 77. The junction between the resistors 74 and 75 is connected through a capacitor 76 to the junction between resistors 72 and 74 at the output side of the capacitor 71.

The output of the transistor Q1 is transformer coupled through the transformer 73 and capacitively coupled through a capacitor 78 to the base input of the transistor Q2. The base of transistor Q2 is biased by resistors 79 and 80, the junction of which is connected to the base of the transistor Q2, while its emitter is connected to ground through a resistor 81. The resistor 80 is in series connection between the base and the collector of the transistor Q2 through a resistor 83, and the junction between the resistors 80 and 83 is connected to the base of the transistor Q2 through the capacitor 84. The output of the transistor Q2 is transformer coupled by an output transformer 85 having its primary 86 in circuit with the collector of the transistor Q2 and its secondary 87 capacitively coupled through a capacitor 88 to the AC power lines 16.

The sensing circuit 36 includes a resistor 90 connected between a source of reference potential such as ground 91 and the secondary 87 of the transformer 85 for sensing the RF current level in the AC power lines 16. Thus, the RF current fed to the power lines 16 is monitored by a sampling resistor 90 and a single primary turn 92 of the transformer 93 constituting the sensing signal coupling circuit 38 having its multi-turn secondary 94 connected to a diode 95, capacitor 96, and a resistor 97. Thus, the output from the secondary 94 of the transformer 93 is rectified and filtered to be provided as a control signal to the voltage variable capacitor 44. Since the voltage variable capacitor 44 is a portion of the tuning capacitance of the transformer 63 by virtue of its connection effectively in parallel with the capacitor 66, the amount of RF drive to the power amplifier is controlled in order to regulate the RF current thus fed to the power line. Therefore, the output current may be maintained optimally at the 90 milliamp regulated level to meet FCC specifications.

The invention may be embodied in other specific forms without departing from its spirit or essential characteristics. The present embodiments are, therefore, to be considered in all respects as illustrate and not restrictive, the scope of the invention being indicated by the claims rather than by the foregoing description, and all changes which come within the meaning and range of the equivalents of the claims are therefore intended to be embraced therein.

What is claimed is:

1. In a cordless telephone system of the type which includes at least a pair of stations, each including a transmitter and a receiver for exchanging modulated RF signals between the pair of stations and adapted to use an AC power line as a signal-radiating medium, a circuit comprising:

an input source of modulated RF signals comprising an RF carrier signal of a predetermined transmission frequency modulated by a modulating signal for transmitting information in a range of frequencies separate from the transmission frequency of said RF carrier signal;

coupling means for receiving said modulated RF signals and providing a first output signal, said coupling means comprising a tuned transformer in operative circuit with a tuning circuit and tuned to about the frequency of said RF transmission signal, said tuning circuit including a controlled reactive impedance for detuning said transformer in response to a control signal;

output amplifying means coupled to said AC power line for receiving and amplifying said output signal from said coupling means for transmission on said AC power line acting as an antenna;

means for sensing the strength of the RF signal coupled to the AC power line and providing a sensing signal representative of the strength of said RF signal on said AC power line, said control signal being determined from said sensing signal, thereby changing the tuning of the coupling means to control the signal to said output amplifying means and thus to limit the current to said AC power line to a predetermined level;

whereby the effects of impedance variations in AC power lines as a transmission medium for signals of a cordless extension phone are minimized.

2. The circuit as set forth in claim 1, wherein said coupling means includes a transformer having a primary in circuit with said tuning circuit; said controlled reactive impedance is a voltage-controlled capacitor; and said control signal is a voltage signal derived from said sensing means.

3. The circuit as set forth in claim 2 wherein said sensing means includes a monitoring impedance in circuit with said AC power line; said sensing signal is an AC signal; and said sensing means includes rectifying means for rectifying said sensing signal to provide said control signal.

4. The circuit as set forth in claim 3, wherein said sensing means includes a monitoring transformer and said monitoring impedance is a monitoring resistor having a predetermined value in circuit with said primary of a monitoring transformer, the secondary of said monitoring transformer being in circuit with said rectifying means to provide said control signal.

5. The circuit as set forth in claim 4, wherein said coupling means includes a tuning network in circuit with the primary of said tuned transformer, said tuning network including a capacitor and said voltage controlled capacitor, a variation in the capacitance of the voltage-controlled capacitor being caused by said control signal to vary the impedance of said tuning network thereby to detune said transformer.

6. A circuit for providing a constant current to an output stage of a cordless telephone transmitter using AC power lines as a transmission medium, said cordless telephone including a portable telephone unit and a base unit, together operatively connected to telephone lines and said AC power lines to exchange an RF carrier signal modulated by telephone switching signals and audio signals between said portable telephone unit and said base unit, said circuit comprising:

means for modulating said RF frequency with said audio range signals to provide an audio-modulated RF output signal, tuned transformer means, including a tuning capacitive circuit which comprises a detuning capacitor having a capacitive value which is variable by a control signal, for providing an amplified audio-modulated RF signal;

means for amplifying the audio-modulated RF signal;

means for coupling said audio-modulated RF signal to said AC power lines for transmission therefrom when said AC power lines act as a transmission medium; and means for sensing the RF component in said AC power lines and providing a control signal representative of the magnitude of said RF current at least when greater than a predetermined maximum to provide said control signal;

said tuned transformer means being detuned by said control signal to couple a lesser magnitude of said RF output signal to said amplifying means, thereby to reduce the magnitude of said RF signal on said power line.

7. The circuit as set forth in claim 6, wherein the RF component on said power lines is limited to 90 mA.

* * * * *